(12) United States Patent
Shavell et al.

(10) Patent No.: US 10,348,755 B1
(45) Date of Patent: Jul. 9, 2019

(54) SYSTEMS AND METHODS FOR DETECTING NETWORK SECURITY DEFICIENCIES ON ENDPOINT DEVICES

(71) Applicant: Symantec Corporation, Mountain View, CA (US)

(72) Inventors: Michael Shavell, Merrimack, NH (US); Kevin Jiang, San Mateo, CA (US); Jose Reyes, Los Angeles, CA (US)

(73) Assignee: Symantec Corporation, Mountain View, CA (US)

( * ) Notice: Subject to any disclaimer, the term of this patent is extended or adjusted under 35 U.S.C. 154(b) by 216 days.

(21) Appl. No.: 15/199,149

(22) Filed: Jun. 30, 2016

(51) Int. Cl.
*H04L 29/06* (2006.01)
*H04W 84/12* (2009.01)

(52) U.S. Cl.
CPC ...... *H04L 63/1433* (2013.01); *H04L 63/1441* (2013.01); *H04W 84/12* (2013.01)

(58) Field of Classification Search
CPC . H04L 63/1433; H04L 63/1441; H04W 84/12
USPC .......................................................... 726/25
See application file for complete search history.

(56) References Cited

U.S. PATENT DOCUMENTS

| | | | | |
|---|---|---|---|---|
| 6,226,372 B1* | 5/2001 | Beebe | ................. | H04L 63/0218 379/145 |
| 6,307,837 B1* | 10/2001 | Ichikawa | ............ | H04L 63/0236 370/230 |
| 7,433,324 B2* | 10/2008 | Switzer | ................... | G06F 9/451 370/254 |

(Continued)

FOREIGN PATENT DOCUMENTS

| | | |
|---|---|---|
| JP | 05327773 A | * 12/1993 |
| JP | 2004259020 A | * 9/2004 |

(Continued)

OTHER PUBLICATIONS

Hsu, Fu-Hau, Fanglu Guo, and Tzi-cker Chiueh. "Scalable network-based buffer overflow attack detection." In Proceedings of the 2006 ACM/IEEE symposium on Architecture for networking and communications systems, pp. 163-172. ACM, 2006. (Year: 2006).*

(Continued)

*Primary Examiner* — Luu T Pham
*Assistant Examiner* — Walter J Malinowski
(74) *Attorney, Agent, or Firm* — FisherBroyles, LLP

(57) ABSTRACT

The disclosed computer-implemented method for detecting network security deficiencies on endpoint devices may include (i) detecting, at a network device, a request from an endpoint device to automatically connect to a wireless network, (ii) establishing, via the network device, a network connection between the endpoint device and a wireless network that appears to be the wireless network requested by the endpoint device but is not actually the requested wireless network, (iii) determining, based on establishing the network connection between the endpoint device and the wireless network that appears to be the requested wireless network, that the endpoint device is vulnerable to network attacks, and then (iv) facilitating, via the network connection, a security action on the endpoint device to protect the endpoint device against the network attacks. Various other methods, systems, and computer-readable media are also disclosed.

16 Claims, 6 Drawing Sheets

(56) References Cited

U.S. PATENT DOCUMENTS

| | | | |
|---|---|---|---|
| 7,793,338 B1* | 9/2010 | Beddoe | H04L 63/1491 726/22 |
| 8,069,483 B1* | 11/2011 | Matlock | H04W 12/12 713/154 |
| 8,191,143 B1 | 5/2012 | Lin et al. | |
| 8,353,044 B1* | 1/2013 | Jones | H04L 67/34 718/1 |
| 8,477,747 B1* | 7/2013 | Sobel | H04W 12/08 370/338 |
| 8,499,348 B1* | 7/2013 | Rubin | G06F 21/554 713/154 |
| 8,606,219 B1 | 12/2013 | Barbee et al. | |
| 8,713,683 B2* | 4/2014 | Moore | G06F 21/85 713/187 |
| 8,776,225 B2* | 7/2014 | Pierson | H04L 63/0876 726/23 |
| 8,844,041 B1 | 9/2014 | Kienzle et al. | |
| 8,949,993 B2* | 2/2015 | Basavapatna | H04W 4/02 726/25 |
| 9,420,513 B1 | 8/2016 | Yalagandula et al. | |
| 9,521,053 B1* | 12/2016 | Chen | H04L 43/08 |
| 9,578,057 B1* | 2/2017 | Spertus | H04L 63/1483 |
| 9,602,536 B1* | 3/2017 | Brown, Jr. | H04L 63/1491 |
| 9,622,081 B1* | 4/2017 | Satish | H04W 12/10 |
| 9,642,069 B2* | 5/2017 | Salkintzis | H04W 76/18 |
| 9,697,172 B1* | 7/2017 | Somohano | H04L 45/02 |
| 9,730,075 B1* | 8/2017 | Shavell | H04W 12/12 |
| 10,084,817 B2* | 9/2018 | Saher | H04L 63/1466 |
| 2003/0145227 A1* | 7/2003 | Boden | H04L 63/0227 726/15 |
| 2003/0219008 A1 | 11/2003 | Hrastar | |
| 2003/0233567 A1 | 12/2003 | Lynn et al. | |
| 2004/0117624 A1 | 6/2004 | Brandt et al. | |
| 2004/0235469 A1* | 11/2004 | Krug | H04W 84/00 455/431 |
| 2004/0236547 A1 | 11/2004 | Rappaport et al. | |
| 2004/0240417 A1* | 12/2004 | Kim | H04W 80/04 370/338 |
| 2005/0268330 A1* | 12/2005 | Di Rienzo | G01S 5/14 726/4 |
| 2006/0018264 A1* | 1/2006 | Yamakawa | H04L 63/145 370/241 |
| 2006/0031938 A1* | 2/2006 | Choi | G06F 21/552 726/25 |
| 2006/0075090 A1* | 4/2006 | Bocking | H04W 48/18 709/224 |
| 2006/0183477 A1* | 8/2006 | Bocking | H04W 48/18 455/435.2 |
| 2006/0193284 A1 | 8/2006 | Stieglitz et al. | |
| 2006/0194582 A1* | 8/2006 | Cooper | H04W 36/0061 455/436 |
| 2006/0200862 A1 | 9/2006 | Olson et al. | |
| 2007/0079376 A1 | 4/2007 | Robert et al. | |
| 2007/0101409 A1* | 5/2007 | Palekar | G06F 21/31 726/4 |
| 2007/0153763 A1 | 7/2007 | Rampolla et al. | |
| 2007/0283042 A1 | 12/2007 | West et al. | |
| 2008/0066145 A1* | 3/2008 | Molen | H04L 12/2814 726/1 |
| 2008/0228914 A1* | 9/2008 | Ofel | H04L 43/0864 709/224 |
| 2008/0250500 A1* | 10/2008 | Olson | G06F 21/552 726/23 |
| 2009/0029677 A1* | 1/2009 | Choi | H04L 63/0869 455/411 |
| 2009/0046733 A1* | 2/2009 | Bueno | H04L 12/467 370/409 |
| 2009/0116441 A1* | 5/2009 | Park | H04W 48/18 370/329 |
| 2009/0288143 A1* | 11/2009 | Stebila | G06F 21/445 726/3 |
| 2010/0115512 A1* | 5/2010 | Sakai | G06F 8/65 718/1 |
| 2010/0146272 A1* | 6/2010 | Centonza | H04W 28/02 713/168 |
| 2010/0172259 A1 | 7/2010 | Aggarwal et al. | |
| 2010/0207732 A1 | 8/2010 | Patwari et al. | |
| 2010/0274892 A1* | 10/2010 | Legrand | H04L 63/1408 709/224 |
| 2011/0040870 A1* | 2/2011 | Wynn | H04L 63/0428 709/224 |
| 2011/0116457 A1* | 5/2011 | Damnjanovic | H04L 1/1854 370/329 |
| 2011/0321166 A1* | 12/2011 | Capalik | H04L 63/1416 726/25 |
| 2012/0166647 A1* | 6/2012 | Nam | H04L 41/5041 709/226 |
| 2012/0209581 A1* | 8/2012 | Gao | H04L 41/0893 703/13 |
| 2012/0254353 A1* | 10/2012 | Baba | H04L 12/4633 709/217 |
| 2012/0304297 A1 | 11/2012 | Chung et al. | |
| 2012/0309420 A1 | 12/2012 | Morgan et al. | |
| 2013/0097710 A1* | 4/2013 | Basavapatna | H04W 4/02 726/25 |
| 2013/0111586 A1* | 5/2013 | Jackson | G06F 11/3438 726/23 |
| 2013/0182697 A1 | 7/2013 | Tuominen et al. | |
| 2013/0217358 A1 | 8/2013 | Snider | |
| 2013/0217411 A1 | 8/2013 | Croy et al. | |
| 2013/0329605 A1* | 12/2013 | Nakil | H04L 41/0668 370/255 |
| 2013/0332602 A1* | 12/2013 | Nakil | G06N 99/005 709/224 |
| 2014/0007222 A1* | 1/2014 | Qureshi | G06F 21/10 726/16 |
| 2014/0201808 A1 | 7/2014 | Yada | |
| 2014/0244808 A1* | 8/2014 | Axelrod | H04L 41/042 709/220 |
| 2014/0304764 A1* | 10/2014 | Banerjee | H04L 63/02 726/1 |
| 2014/0304770 A1 | 10/2014 | Jung | |
| 2014/0312848 A1* | 10/2014 | Alexander | H02J 7/0013 320/134 |
| 2014/0359707 A1* | 12/2014 | Smithson | H04L 63/08 726/4 |
| 2014/0378059 A1 | 12/2014 | Ouchi | |
| 2015/0024787 A1 | 1/2015 | Ben-Itzhak et al. | |
| 2015/0067102 A1* | 3/2015 | Tsarkova | H04N 21/21805 709/217 |
| 2015/0180898 A1* | 6/2015 | Liljenstam | H04W 12/12 726/23 |
| 2015/0229609 A1* | 8/2015 | Chien | H04L 63/101 726/13 |
| 2015/0271194 A1* | 9/2015 | Szucs | H04L 63/0869 726/23 |
| 2015/0319203 A1* | 11/2015 | Jeremias | H04L 51/20 715/753 |
| 2015/0326612 A1* | 11/2015 | Faccin | H04W 48/16 726/1 |
| 2016/0029217 A1 | 1/2016 | Yoo | |
| 2016/0029221 A1* | 1/2016 | Suarez Garcia | G06F 21/561 455/410 |
| 2016/0095146 A1* | 3/2016 | Ren | H04W 76/14 370/329 |
| 2016/0099972 A1* | 4/2016 | Qureshi | H04L 63/20 726/1 |
| 2016/0149935 A1 | 5/2016 | Liu et al. | |
| 2016/0149937 A1* | 5/2016 | Katmor | H04L 63/0263 726/23 |
| 2016/0192136 A1 | 6/2016 | Pan et al. | |
| 2016/0203528 A1* | 7/2016 | Saha | G06Q 30/04 705/34 |
| 2016/0269439 A1* | 9/2016 | Ho | H04L 63/0254 |
| 2016/0277251 A1* | 9/2016 | Dempo | H04L 12/4641 |
| 2016/0294619 A1* | 10/2016 | Schroeder | H04W 4/21 |
| 2016/0316426 A1 | 10/2016 | Kumar | |
| 2016/0359695 A1* | 12/2016 | Yadav | G06N 99/005 |
| 2016/0359891 A1* | 12/2016 | Pang | H04L 63/1425 |
| 2017/0054818 A1* | 2/2017 | Hassan | H04L 65/1069 |

(56) References Cited

U.S. PATENT DOCUMENTS

| | | | |
|---|---|---|---|
| 2017/0063651 A1* | 3/2017 | Wang | H04L 43/04 |
| 2017/0063940 A1* | 3/2017 | Lapidous | H04L 63/0281 |
| 2017/0195357 A1* | 7/2017 | Sundhar | H04L 63/1433 |
| 2017/0223032 A1* | 8/2017 | El-Moussa | H04L 63/1416 |
| 2017/0331858 A1* | 11/2017 | Clark, III | H04L 63/1491 |
| 2017/0359306 A1* | 12/2017 | Thomas | H04L 63/10 |
| 2018/0102892 A1* | 4/2018 | Lunttila | H04L 1/1607 |
| 2018/0123898 A1* | 5/2018 | Yakuwa | H04L 41/14 |

FOREIGN PATENT DOCUMENTS

| | | | |
|---|---|---|---|
| JP | 2006279404 A | * | 10/2006 |
| KR | 20150134172 A | * | 12/2015 |

OTHER PUBLICATIONS

Binsalleeh, Hamad, and Amr Youssef. "An implementation for a worm detection and mitigation system." In Communications, 2008 24th Biennial Symposium on, pp. 54-57. IEEE, 2008. (Year: 2008).*

Pachghare, V. K., and Parag Kulkarni. "Performance aNALYSIs of pattern based network security." In Computer Technology and Development (ICCTD), 2010 2nd International Conference on, pp. 277-281. IEEE, 2010. (Year: 2010).*

Dong, Lijun, Xiaojun Kang, and Jun Song. "A WTLS-based virtual private network for wireless intrusion prevention." In 2010 International Conference on Computer Application and System Modeling (ICCASM 2010), vol. 3, pp. V3-467. IEEE, 2010. (Year: 2010).*

Patiyoot, D., and S. J. Shepherd. "Security issues for wireless ATM networks." In ICUPC'98. IEEE 1998 International Conference on Universal Personal Communications. Conference Proceedings (Cat. No. 98TH8384), vol. 2, pp. 1359-1363. IEEE, 1998. (Year: 1998).*

Condry, Michael W., and Catherine Blackadar Nelson. "Using smart edge IoT devices for safer, rapid response with industryIoT control operations." Proceedings of the IEEE 104, No. 5 (2016): 938-946. (Year: 2016).*

Marchetto, Guido, Riccardo Sisto, Jalolliddin Yusupov, and Adlen Ksentinit. "Formally verified latency-aware vnf placement in industrial internet of things." In 2018 14th IEEE International Workshop on Factory Communication Systems (WFCS), pp. 1-9. IEEE, 2018. (Year: 2018).*

Justin Harmon; Systems and Methods for Detecting Potentially Illegitimate Wireless Access Points; U.S. Appl. No. 14/608,218, filed Jan. 29, 2015.

Michael Shavell, et al; Systems and Methods for Detecting Illegitimate Devices on Wireless Networks; U.S. Appl. No. 14/616,763, filed Feb. 9, 2015.

Michael Shavell., et al; Systems and Methods for Detecting Illegitimate Devices on Wireless Networks; U.S. Appl. No. 14/616,761, filed Feb. 9, 2015.

Justin Harmon; Systems and Methods for Detecting Potentially Illegitimate Wireless Access Points; U.S. Appl. No. 14/625,075, filed Feb. 18, 2015.

Lim, Kwontaek et al., "Scheme of Rogue AP detection in managed WLAN based on AP's location", http://xuebao.nuc.edu.cn/new/english.php?id=85&tid=646, as accessed Dec. 3, 2014, Journal of Measurement Science and Instrumentation, vol. 3 No. 4, Sum No. 12, (Dec. 2012).

Lim, Kwontaek et al., "Scheme of Rogue AP detection in managed WLAN based on AP's location", http://xuebao.nuc.edu.cn/new/uploads/File/jmsi2012-4-370.pdf, as accessed Dec. 3, 2014, Journal of Measurement Science and Instrumentation, vol. 3 No. 4, Sum No. 12, (Dec. 2012), pp. 370-373.

"WiFi Pineapple", https://www.wifipineapple.com/, as accessed Dec. 3, 2014, (Sep. 26, 2011).

"Smart WiFi Toggler", https://play.google.com/store/apps/details?id=com.sebouh00.smartwifitoggler&hl=en, as accessed Dec. 3, 2014, (Dec. 13, 2012).

"Coordinate Distance Calculator", http://boulter.com/gps/distance/?from=38.2500%B0+N%2C+85.7667%B0+W&to=38.0297%B0+N%2+84.4947%B0+W&units=m, as accessed Dec. 3, 2014, (on or before Dec. 3, 2014).

"802.11 WLAN Packet Types", http://www.wildpackets.com/resources/compendium/wireless_lan/wlan_packet_types, as accessed Dec. 3, 2014, WildPackets, Inc., (Apr. 15, 2010).

"Wireless access point", http://en.wikipedia.org/wiki/Wireless_access_point, as accessed Dec. 3, 2014, Wikipedia, (Apr. 14, 2004).

"Stop connecting to a particular wifi network based on my location", http://android.stackexchange.com/questions/83925/stop-connecting-to-a-particular-wifi-network-based-on-my-location, as accessed Dec. 3, 2014, (Oct. 2, 2014).

"How to block apps on tablet from accessing the Internet while on tethering", http://android.stackexchange.com/questions/63987/how-to-block-apps-on-tablet-from-accessing-the-internet-while-on-tethering, as accessed Dec. 3, 2014, (Feb. 21, 2014).

Cipriani, Jason, "Stop Android 4.3 from always scanning for Wi-Fi networks", http://www.cnet.com/how-to/stop-android-4-3-from-always-scanning-for-wi-fi-networks/, as accessed Dec. 3, 2014, (Aug. 2, 2013).

Boubina DR, "How to Disable Wifi Auto Connect on iPhone", https://snapguide.com/guides/disable-wifi-auto-connect-on-iphone/, as accessed Dec. 3, 2014, (Jul. 22, 2012).

"LG G3—WiFi Auto-On Issue", https://support.t-mobile.com/thread/75809, as accessed Dec. 3, 2014, (Aug. 7, 2014).

"Best Practices for Rogue Detection and Annihilation", http://airmagnet.flukenetworks.com/assets/whitepaper/Rogue_Detection_White_Paper.pdf, as accessed Dec. 3, 2014, A Technical Whitepaper, AirMagnet, Inc., (Nov. 2004).

"How do you prevent rogue wireless access points on a network?", http://networkengineering.stackexchange.com/questions/123/how-do-you-prevent-rogue-wireless-access-points-on-a-network, as accessed Dec. 3, 2014, (May 8, 2013).

K. N., Gopinath et al., "All You Wanted to Know About WiFi Rogue Access Points", http://www.rogueap.com/rogue-ap-docs/RogueAP-FAQ.pdf, as accessed Dec. 3, 2014, AirTight Networks, Inc., (2009).

"Rogue access point", http://en.wikipedia.org/wiki/Rogue_access_point, as accessed Dec. 3, 2014, Wikipedia, (Oct. 22, 2005).

"Rogue access points: Preventing, detecting and handling best practices", http://searchnetworking.techtarget.com/Rogue-access-points-Preventing-detecting-and-handling-best-practices, as accessed Dec. 3, 2014, TechTarget, (May 2009).

"Tracking down a rogue access point", http://security.stackexchange.com/questions/10783/tracking-down-a-rogue-access-point, as accessed Dec. 9, 2014, (Jan. 18, 2012).

"Traceroute", https://en.wikipedia.org/wiki/Traceroute, as accessed Dec. 9, 2014, Wikipedia, (Feb. 24, 2004).

Hunt, Troy, "The beginners guide to breaking website security with nothing more than a Pineapple", http://www.troyhunt.com/2013/04/the-beginners-guide-to-breaking-website.html, as accessed Dec. 9, 2014, (Apr. 17, 2013).

Michael Shavell, et al.; Systems and Methods for Detecting Illegitimate Devices on Wireless Networks; U.S. Appl. No. 14/617,245, filed Feb. 9, 2015.

"Why don't wifi managers remember mac addresses for hotspots to defeat the jasager attack?", http://security.stackexchange.com/questions/14854/why-dont-wifi-managers-remember-mac-addresses-for-hotspots-to-defeat-the-jasage, as accessed Dec. 9, 2014, (May 10, 2012).

"7. MAC Frame Formats", http://grouper.ieee.org/groups/802/15/pub/2001/Jul01/01292r1P802-15_TG3-Proposed-Changes-to-Frame-Formats.pdf, as accessed Dec. 9, 2014, (2001).

"Frame check sequence", http://en.wikipedia.org/wiki/Frame_check_sequence, as accessed Dec. 9, 2014, Wikipedia, (Apr. 5, 2005).

"Service set (802.11 network)", http://en.wikipedia.org/wiki/Service_set_%28802.11_network%29, as accessed Dec. 9, 2014, Wikipedia, (Jul. 10, 2009).

"Part 11: Wireless LAN Medium Access Control (MAC) and Physical Layer (PHY) Specifications", http://standards.ieee.org/getieee802/download/802.11-2012.pdf, as accessed Dec. 9, 2014, IEEE Std 802.11™—2012 (Revision of IEEE Std 802.11-2007), IEEE Computer Society, New York, (Feb. 6, 2012).

(56) References Cited

OTHER PUBLICATIONS

Dai Zovi, Dino A., "KARMA Attacks Radioed Machines Automatically", http://theta44.org/karma/, as accessed Dec. 9, 2014, (Jan. 17, 2006).

Girsas, Paul, "Wifi Radar", https://play.google.com/store/apps/details?id=girsas.wifiradar&hl=en, as accessed Jan. 16, 2015, (Dec. 24, 2013).

"Chapter 6—Configuring Radio Setting", http://www.cisco.com/c/en/us/td/docs/wireless/access_point/12-4_10b_JA/configuration/guide/scg12410b/scg12410b-chap6-radio.html, as accessed Jan. 16, 2015, Cisco, (on or before Sep. 15, 2014).

"Chapter 9—Configuring an Access Point as a Local Authenticator", http://www.cisco.com/c/en/us/td/docs/wireless/laccess_point/12-4_10b_JA/configuration/guide/scg12410b/scg12410b-chap9-localauth.html, as accessed Jan. 16, 2015, Cisco, (on or before Sep. 6, 2014).

"WLA Series Wireless LAN Access Points", https://www.juniper.net/assets/us/en/local/pdf/datasheets/1000359-en.pdf, as accessed Jan. 16, 2015, Data Sheet, Juniper Networks, Inc., (Jun. 2013).

"Aruba 100 Series Access Points", http://www.arubanetworks.com/assets/ds/DS_AP100Series.pdf, as accessed Jan. 16, 2015, Data Sheet, Aruba Networks, Inc., (on or before Jan. 16, 2015).

Notenboom, Leo A., "How can I block neighboring wireless networks?", http://ask-leo.com/how_can_i_block_neighboring_wireless_networks.html, as accessed Jan. 16, 2015, (Jan. 30, 2007).

Roos, Dave, "How Wireless Mesh Networks Work", http://computer.howstuffworks.com/how-wireless-mesh-networks-work.htm, as accessed Jan. 16, 2015, (Dec. 4, 2008).

Leslie, David, "Rogue Wireless Access Point Detection and Remediation", http://www.giac.org/paper/gsec/4060/rogue-wireless-access-point-detection-remediation/106460, as accessed Jan. 16, 2015, Global Information Assurance Certification Paper, SANS Institute 2004, (Sep. 9, 2004).

Pacchiano, Ronald, "How to Track Down Rogue Wireless Access Points", http://www.smallbusinesscomputing.com/webmaster/article.php/3590656/How-to-Track-Down-Rogue-Wireless-Access-Points.htm, as accessed Jan. 16, 2015, (Mar. 10, 2006).

"Rogue Detection under Unified Wireless Networks", http://www.cisco.com/c/en/us/support/docs/wireless-mobility/wireless-lan-wlan/70987-rogue-detect.html, as accessed Jan. 16, 2015, Document ID: 70987, Cisco, (on or before Sep. 25, 2007).

"Locating Rogue WiFi Access Points", https://www.virtuesecurity.com/blog/locating-rogue-wifi-access-points/, as accessed Jan. 16, 2015, Virtue Security, (Oct. 5, 2013).

"NetSurveyor—802.11 Network Discovery / WiFi Scanner", http://nutsaboutnets.com/netsurveyor-wifi-scanner/, as accessed Jan. 16, 2015, Nuts About Nets, (Nov. 16, 2011).

Ankit Kurani; Systems and Methods for Detecting Potentially Illegitimate Wireless Access Points; U.S. Appl. No. 14/732,811, filed Jun. 8, 2015.

"Domain Name System", http://en.wikipedia.org/wiki/Domain_Name_System, as accessed Apr. 6, 2015, Wikipedia, (Jan. 23, 2004).

Mitchell, Bradley, "What is a DNS Server?", http://compnetworking.about.com/od/dns_domainnamesystem/f/dns_servers.htm, as accessed Apr. 6, 2015, (Feb. 19, 2007).

"What is the difference between public and private IP addresses?", http://supportcenter.verio.com/KB/questions.php?questionid=655, as accessed Apr. 6, 2015, Verio Inc., (on or before Apr. 6, 2015).

"802.11 WLAN Packet Types", http://www.wildpackets.com/resources/compendium/wireiess_lan/wlan_packet_types, as accessed Oct. 14, 2015, (Apr. 15, 2010).

Captive portal; https://en.wikipedia.org/wiki/Captive_portal, as accessed May 17, 2016; Wikipedia; (Jan. 25, 2005).

Michael Shavell, et al; Systems and Methods for Preventing Computing Devices from Sending Wireless Probe Packets; U.S. Appl. No. 14/949,927, filed Nov. 24, 2015.

\* cited by examiner

SYSTEMS AND METHODS FOR DETECTING NETWORK SECURITY DEFICIENCIES ON ENDPOINT DEVICES

BACKGROUND

Wireless networks and wireless access points may provide users of internet-enabled devices with efficient and/or widespread access to a variety of network resources. To facilitate a quick and seamless connection to a wireless network, a computing device may store the configuration details of the network after connecting to the network for the first time. The device may then periodically distribute requests that enable the device to automatically re-connect to the network when re-entering the network's range.

Unfortunately, automatically attempting to connect to known wireless networks may leave computing devices vulnerable to network attacks. For example, conventional network security systems may fail to provide any reliable and/or trusted techniques for computing devices to verify the legitimacy or identity of a wireless network. As a result, an attacker may configure a malicious device (e.g., a so-called WIFI PINEAPPLE) to mimic the credentials of a wireless network known to a computing device after intercepting a request by the device to connect to the network. The malicious device may then connect the device to an illegitimate wireless network that appears to be the known network. Furthermore, many users of internet-enabled devices may not be aware of the risks of such network attacks, much less solutions for protecting their devices against these attacks. The instant disclosure, therefore, identifies and addresses a need for improved systems and methods for detecting network security deficiencies on endpoint devices.

SUMMARY

As will be described in greater detail below, the instant disclosure describes various systems and methods for detecting network security deficiencies on endpoint devices by providing a connection to an illegitimate wireless network that appears to be a wireless network requested by an endpoint device (but is not actually the requested wireless network) and then determining whether the endpoint device connects to the illegitimate wireless network. In one example, a computer-implemented method for performing such a task may include (i) detecting, at a network device, a request from an endpoint device to automatically connect to a wireless network, (ii) establishing, via the network device, a network connection between the endpoint device and a wireless network that appears to be the wireless network requested by the endpoint device but is not actually the requested wireless network, (iii) determining, based on establishing the network connection between the endpoint device and the wireless network that appears to be the requested wireless network, that the endpoint device is vulnerable to network attacks, and then (iv) facilitating, via the network connection, a security action on the endpoint device to protect the endpoint device against the network attacks.

In some examples, the method may further include determining that the endpoint device is known to the network device before establishing the network connection between the endpoint device and the wireless network that appears to be the wireless network requested by the endpoint device. In these examples, determining that the endpoint device is known to the network device may include determining that the endpoint device has previously connected to a legitimate wireless network provided by the network device. In addition, in some embodiments, the method may further include managing network connections between multiple endpoint devices known to the network device and wireless networks that appear to be wireless networks requested by the multiple endpoint devices based on input from an administrator of the network device.

Additionally, in some examples, the method may include detecting an additional request from the endpoint device to automatically connect to the legitimate wireless network before detecting the request from the endpoint device to automatically connect to the wireless network. The method may then include establishing the network connection between the endpoint device and the wireless network that appears to be the requested wireless network rather than establishing a network connection between the endpoint device and the legitimate wireless network. Furthermore, the method may include establishing the network connection between the endpoint device and the legitimate wireless network after the security action on the endpoint device has been completed.

In some embodiments, establishing the network connection between the endpoint device and the wireless network that appears to be the requested wireless network may include indicating, to the endpoint device, that the requested wireless network is available but that the requested wireless network does not utilize an authentication scheme that is used by the requested wireless network. In such embodiments, determining that the endpoint device is vulnerable to the network attacks may include determining that the endpoint device connected to the wireless network that appears to be the requested wireless network despite the indication that the requested wireless network does not utilize the authentication scheme.

In some examples, facilitating the security action on the endpoint device may include directing a user of the endpoint device to increase network security protocols on the endpoint device. In one embodiment, increasing the network security protocols on the endpoint device may include preventing the endpoint device from automatically attempting to connect to the wireless network and/or removing the wireless network from a list of trusted wireless networks that indicates wireless networks to which the endpoint device automatically attempts to connect. In addition, directing the user of the endpoint device to increase the network security protocols on the endpoint device may include presenting, on the endpoint device, a captive portal that prompts the user to increase the network security protocols before the endpoint device is allowed to access network resources via the network connection.

In one embodiment, a system for implementing the above-described method may include (i) a detection module that detects, at a network device, a request from an endpoint device to automatically connect to a wireless network, (ii) a connection module that establishes, via the network device, a network connection between the endpoint device and a wireless network that appears to be the wireless network requested by the endpoint device but is not actually the requested wireless network, (iii) a determination module that determines, based on establishing the network connection between the endpoint device and the wireless network that appears to be the requested wireless network, that the endpoint device is vulnerable to network attacks, and (iv) a security module that facilitates, via the network connection, a security action on the endpoint device to protect the endpoint device against the network attacks. In addition, the system may include at least one hardware processor configured to execute the detection module, the connection module, the determination module, and the security module.

In some examples, the above-described method may be encoded as computer-readable instructions on a non-transitory computer-readable medium. For example, a computer-readable medium may include one or more computer-executable instructions that, when executed by at least one processor of a network device, may cause the network device to (i) detect, at the network device, a request from an endpoint device to automatically connect to a wireless network, (ii) establish, via the network device, a network connection between the endpoint device and a wireless network that appears to be the wireless network requested by the endpoint device but is not actually the requested wireless network, (iii) determine, based on establishing the network connection between the endpoint device and the wireless network that appears to be the requested wireless network, that the endpoint device is vulnerable to network attacks, and then (iv) facilitate, via the network connection, a security action on the endpoint device to protect the endpoint device against the network attacks.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
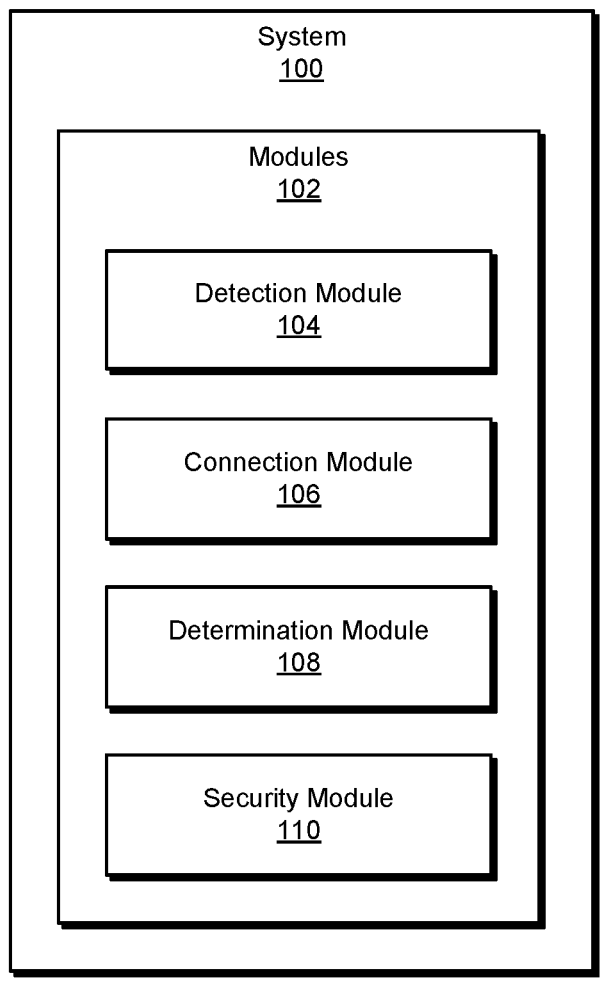
FIG. 1 is a block diagram of an exemplary system for detecting network security deficiencies on endpoint devices.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for detecting network security deficiencies on endpoint devices. As will be explained in greater detail below, by establishing a connection between an endpoint device and an illegitimate wireless network that appears to be a wireless network requested by the endpoint device, the systems and methods described herein may carry out a fake network attack on the endpoint device to determine whether the endpoint device is vulnerable to network attacks by actual attackers. After determining that an endpoint device is vulnerable to network attacks, the disclosed systems and methods may prevent potential network attacks on the endpoint device by instructing a user of the endpoint device to increase one or more security settings or protocols on the endpoint device.

Figure 2:
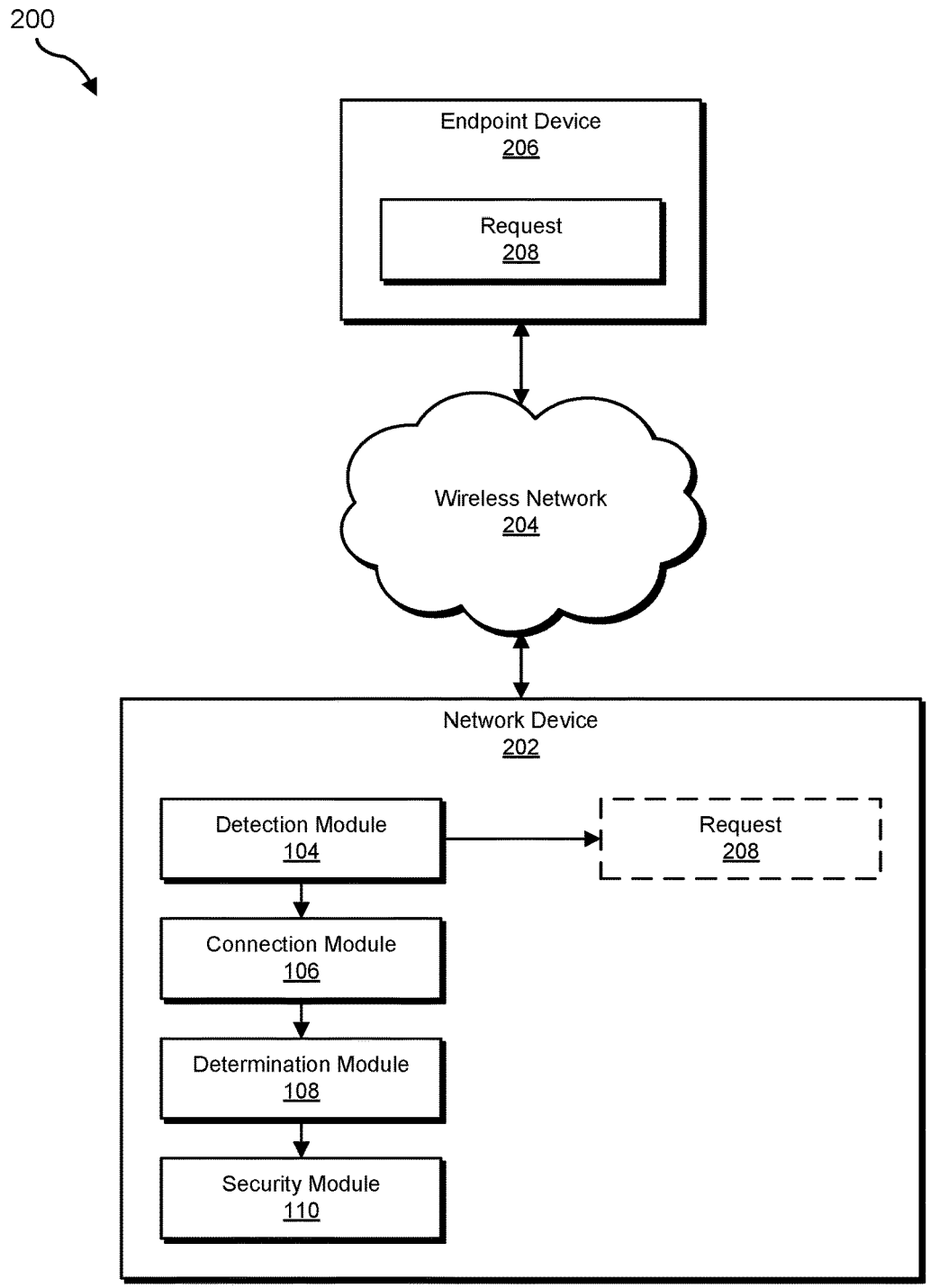
FIG. 2 is a block diagram of an additional exemplary system for detecting network security deficiencies on endpoint devices.

The following will provide, with reference to FIGS. 1 and 2, detailed descriptions of exemplary systems for detecting network security deficiencies on endpoint devices. Detailed descriptions of corresponding computer-implemented methods will also be provided in connection with FIG. 3. In addition, detailed descriptions of exemplary captive portals that direct users of endpoint devices to increase security protocols on the endpoint devices will be provided in connection with FIG. 4. Finally, detailed descriptions of an exemplary computing system and network architecture capable of implementing one or more of the embodiments described herein will be provided in connection with FIGS. 5 and 6, respectively.

FIG. 1 is a block diagram of an exemplary system 100 for detecting network security deficiencies on endpoint devices. As illustrated in this figure, exemplary system 100 may include one or more modules 102 for performing one or more tasks. For example, and as will be explained in greater detail below, exemplary system 100 may include a detection module 104 that detects, at a network device, a request from an endpoint device to automatically connect to a wireless network. Exemplary system 100 may also include a connection module 106 that establishes, via the network device, a network connection between the endpoint device and a wireless network that appears to be the wireless network requested by the endpoint device but is not actually the requested wireless network.

In addition, and as will be described in greater detail below, exemplary system 100 may include a determination module 108 that determines, based on establishing the network connection between the endpoint device and the wireless network that appears to be the requested wireless network, that the endpoint device is vulnerable to network attacks. Finally, exemplary system 100 may include a security module 110 that facilitates, via the network connection, a security action on the endpoint device to protect the endpoint device against the network attacks. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., network device 202 and/or endpoint device 206), computing system 510 in FIG. 5, and/or portions of exemplary network architecture 600 in FIG. 6. One or more of modules 102 in FIG. 1 may also represent all or portions of one or more special-purpose computers configured to perform one or more tasks.

Exemplary system 100 in FIG. 1 may be implemented in a variety of ways. For example, all or a portion of exemplary system 100 may represent portions of exemplary system 200 in FIG. 2. As shown in FIG. 2, system 200 may include a network device 202 in communication with an endpoint device 206 via a wireless network 204. In one example, network device 202 may be programmed with one or more of modules 102. In this example, network device 202 may operate as part of a security service that identifies network security deficiencies on endpoint devices (such as endpoint device 206) that attempt to communicate with and/or connect to network device 202. Additionally or alternatively, endpoint device 206 may be programmed with one or more of modules 102. In these examples, the modules hosted on endpoint device 206 may perform one or more security actions on endpoint device 206 to protect endpoint device 206 from network attacks.

In one embodiment, one or more of modules 102 from FIG. 1 may, when executed by at least one processor of network device 202, enable network device 202 to detect network security deficiencies on endpoint devices. For example, and as will be described in greater detail below, detection module 104 may cause network device 202 to detect, at network device 202, a request 210 from endpoint device 206 to automatically connect to a wireless network. Connection module 106 may then cause network device 202 to establish a network connection between endpoint device 206 and a wireless network 204 that appears to be the wireless network requested by endpoint device 206 but is not actually the requested wireless network. Next, determination module 108 may cause network device 202 to determine, based on the network connection between endpoint device 206 and wireless network 204, that endpoint device 206 is vulnerable to network attacks. Finally, security module 110 may cause network device 202 to facilitate, via wireless network 204, a security action on endpoint device 206 to protect endpoint device 206 against the network attacks.

Network device 202 generally represents any type or form of computing device that is capable of providing or establishing a wireless network or network connection. Examples of network device 202 include, without limitation, modems, routers, hubs, switches, gateways, wireless access points, and repeaters. In some examples, network device 202 may provide one or more legitimate wireless networks in addition to hosting modules 102. For example, network device 202 may represent a personal (e.g., home) network device that provides a legitimate wireless network for a dedicated group of users and/or endpoint devices.

The term "legitimate wireless network," as used herein, generally refers to any secure, trusted, and/or verified wireless network that accurately and truthfully asserts its identity. In contrast, the term "illegitimate wireless network," as used herein, generally refers to any wireless network that falsely or maliciously claims to be another wireless network.

Endpoint device 206 generally represents any type or form of computing device capable of reading computer-executable instructions and/or connecting to a wireless network. Examples of endpoint device 206 include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, exemplary computing system 510 in FIG. 5, or any other suitable computing device.

Wireless network 204 generally represents any medium or architecture capable of facilitating communication or data transfer. Examples of wireless network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 600 in FIG. 6, or the like. In one embodiment, network device 202 may facilitate connecting endpoint device 206 to wireless network 204.

Figure 3:
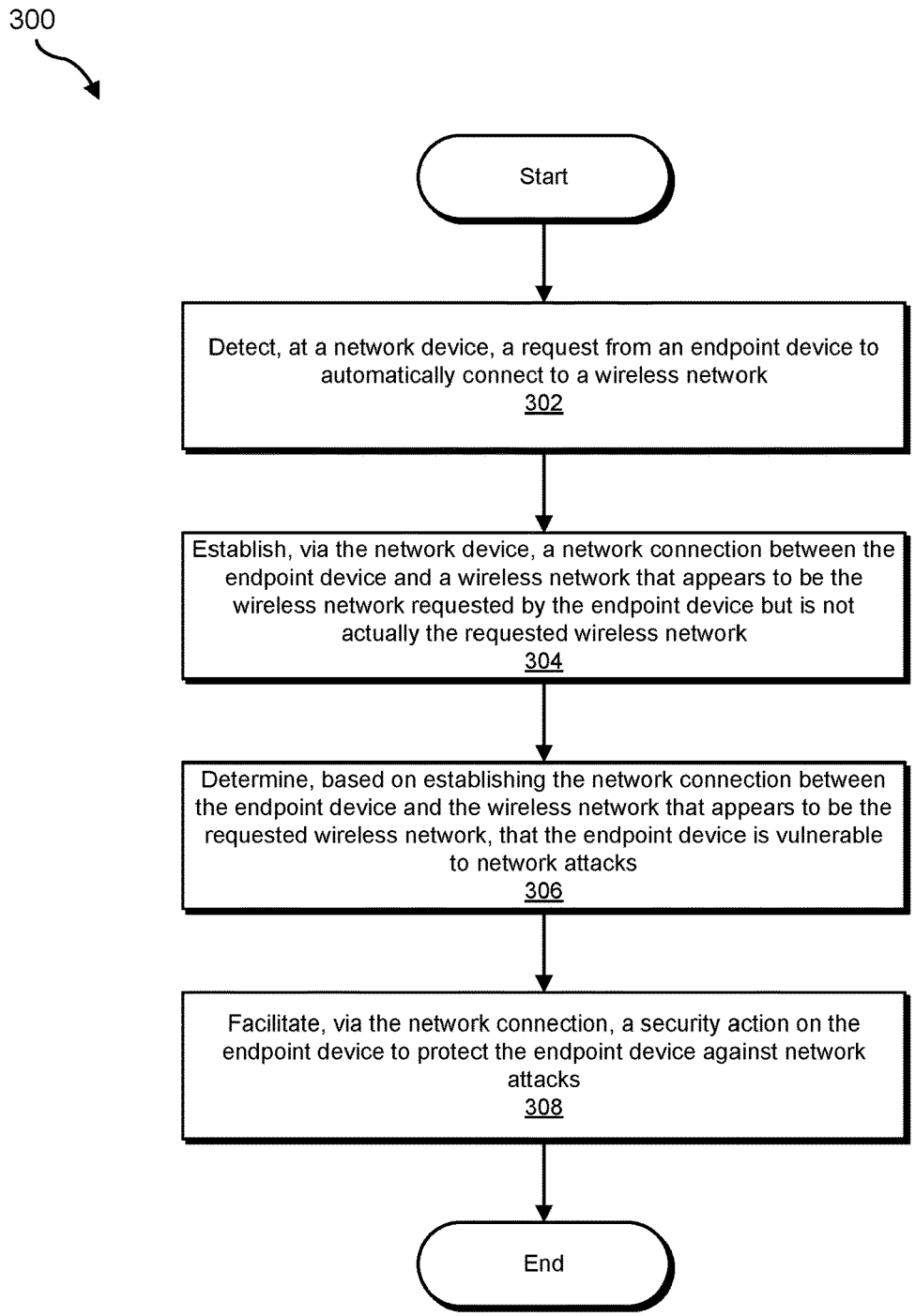
FIG. 3 is a flow diagram of an exemplary method for detecting network security deficiencies on endpoint devices.

FIG. 3 is a flow diagram of an exemplary computer-implemented method 300 for detecting network security deficiencies on endpoint devices. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 510 in FIG. 5, and/or portions of exemplary network architecture 600 in FIG. 6.

As illustrated in FIG. 3, at step 302 one or more of the systems described herein may detect, at a network device, a request from an endpoint device to automatically connect to a wireless network. For example, detection module 104 may, as part of network device 202 in FIG. 2, detect, at network device 202, request 210 from endpoint device 206 to automatically connect to a wireless network.

The systems described herein may detect a request from an endpoint device to automatically connect to a wireless network in a variety of ways. In some examples, an endpoint device may periodically transmit requests to connect to one or more wireless networks to which the endpoint device has previously connected. For example, while an endpoint device is not connected to any network, the endpoint device may distribute (e.g., every half second, every second, etc.) specially-formatted requests (such as probe request frames within an 802.11 protocol) to determine whether any networks known to the endpoint device are available. Such requests may identify a requested network in a variety of ways, such as by including a Service Set Identifier (SSID) of the network and/or a Basic Service Set Identifier (BSSID) of a wireless access point that provides access to the network. In addition, such a request may identify the endpoint device requesting the network (e.g., by including a BSSID assigned to the endpoint device).

Detection module 104 may detect and/or intercept all or a portion of the requests distributed by endpoint devices while the endpoint devices are within the vicinity of the network device hosting modules 102. For example, detection module 104 may identify each request received by the host network device. After identifying a request, detection module 104 may analyze the request to identify the endpoint device that distributed the request, as well as the requested wireless network. As will be explained in greater detail below, the systems described herein may establish a connection between an endpoint device and a wireless network that appears to be a network requested by the endpoint device based on one or more characteristics of the endpoint device and/or requested network.

Returning to FIG. 3, at step 304 one or more of the systems described herein may establish, via the network device, a network connection between the endpoint device and a wireless network that appears to be the wireless network requested by the endpoint device but is not actually the requested wireless network. For example, connection module 106 may, as part of network device 202 in FIG. 2, establish a connection between endpoint device 206 and wireless network 204.

The systems described herein may establish a connection between an endpoint device and a wireless network that appears to be a requested wireless network in a variety of ways. In some examples, connection module 106 may initiate the process of establishing a connection to a wireless network that appears to be a wireless network requested by an endpoint device by distributing, to the endpoint device, any type or form of message or notification that alleges the requested wireless network is available. For example, connection module 106 may distribute a response (such as a probe response frame via an 802.11 protocol) that contains a requested SSID and/or BSSID identified within a request transmitted by the endpoint device. A probe response frame or similar message may contain any additional configuration details about an allegedly available wireless network, such as a data rate of the network and/or a type of encryption, password, or other security protocol implemented by the network.

In some embodiments, an endpoint device may receive such a response from connection module 106 and determine that the wireless network requested by the endpoint device is available based on the response. For example, the endpoint device may be unable to determine that the response describes an illegitimate wireless network. As such, the endpoint device may continue the process of connecting to the wireless network that appears to be the requested wireless network. For example, the endpoint device may distribute one or more authentication messages (such as authentication frames via an 802.11 protocol) to connection module 106 to verify the identity of the endpoint device. In response, connection module 106 may transmit one or more authentication messages to the endpoint device, which may complete the process of establishing the connection between the endpoint device and the wireless network that appears to be the requested wireless network.

In some examples, connection module 106 may establish a connection between an endpoint device and a requested wireless network only after determining that the endpoint device is known or familiar to the network device hosting modules 102. In one embodiment, connection module 106 may determine that an endpoint device is known in the event that the endpoint device has previously connected to a legitimate wireless network provided by a host network device. Additionally or alternatively, connection module 106 may determine that an endpoint device is known in the event that the endpoint device has registered or signed up for the security services provided by the disclosed systems. In this way, connection module 106 may avoid disrupting network sessions of users that do not wish to receive the disclosed security services. Furthermore, in additional embodiments, connection module 106 may reduce disruptions to network sessions of users that do wish to receive the disclosed security services by performing the security tests described herein at periodic and/or predetermined intervals, rather than after each detected request to connect to a wireless network.

In some embodiments, connection module 106 may establish connections between endpoint devices known to a network device and wireless networks that appear to be wireless networks requested by the known endpoint devices based on input from a user of the network device. For example, connection module 106 may provide a portal, input field, or other user interface on the network device that enables an administrator of the network device to specify settings or configuration details that indicate how and/or when network connections should be provided for certain endpoint devices. Specifically, connection module 106 may enable an administrator to manually indicate which endpoint devices wish to receive the disclosed security services (i.e., which endpoint devices are known to the network device). Additionally or alternatively, connection module 106 may enable an administrator to specify a frequency and/or schedule with which the known endpoint devices are to be tested for network security deficiencies.

In some examples, instead of providing security services for endpoint devices known to a network device, connection module 106 may provide a connection to a wireless network that appears to be a requested wireless network after each detected request from an endpoint device, regardless of whether the endpoint device is known to a host network device. For example, the systems described herein may be implemented within a public network device that provides a public network (such as a hotspot) or a public security service. In this example, the public network device may be configured to provide security services for all endpoint devices within the vicinity of the network device.

In some embodiments, connection module 106 may determine that an endpoint device requests to access multiple wireless networks. For example, connection module 106 may determine that the same endpoint device has distributed successive requests to connect to a variety of wireless networks. In one embodiment, connection module 106 may determine that the endpoint device requests to connect to a private wireless network provided by the network device hosting modules 102 in addition to one or more other wireless networks not provided by the host network device. In this embodiment, connection module 106 may prioritize attempting to connect the endpoint device to wireless networks that appear to be the networks not provided by the host network device, rather than connecting the endpoint device to the private network. Specifically, connection module 106 may postpone connecting the endpoint device to the private network until determining whether the endpoint device will establish connections to wireless networks that appear to be each additional wireless network requested by the endpoint device.

In some examples, connection module 106 may include, within a response to an endpoint device that indicates a requested wireless network is available, information specifically designed to test the endpoint device's ability to distinguish between legitimate and illegitimate wireless networks. For example, connection module 106 may include, within a probe response frame, configuration information about an allegedly available wireless network that is inconsistent with actual configuration information about the wireless network. In particular, connection module 106 may indicate that a requested wireless network implements a different authentication scheme or security protocol than is actually implemented by the requested wireless network. For example, connection module 106 may indicate that a requested wireless network is public and/or unsecure (i.e., uses no security protocol), while the requested network actually implements a Wi-Fi Protected Access (WPA) protocol.

Returning to FIG. 3, at step 306 one or more of the systems described herein may determine, based on establishing the network connection between the endpoint device and the wireless network that appears to be the requested wireless network, that the endpoint device is vulnerable to network attacks. For example, determination module 108 may, as part of network device 202 in FIG. 2, determine, based on the network connection established between endpoint device 206 and wireless network 204, that endpoint device 206 is vulnerable to network attacks.

The systems described herein may determine that an endpoint device is vulnerable to network attacks in a variety of ways. In some examples, performing the above-described process of establishing a connection between an endpoint device and an illegitimate wireless network that appears to be a requested wireless network may replicate a type of network attack used to intercept network communications distributed by endpoint devices. Such an attack may be known as a KARMA attack. Determination module 108 may determine that an endpoint device that established a connection to an illegitimate wireless network provided by connection module 106 (resulting in a successful KARMA attack) may be susceptible to similar attacks from actual attackers. For example, determination module 108 may determine that an endpoint device that connects to an illegitimate network provided by connection module 106 engages in risky network behaviors and/or does not implement appropriate security protocols to determine whether an available wireless network is legitimate or illegitimate.

Returning to FIG. 3, at step 308 one or more of the systems described herein may facilitate, via the network connection, a security action on the endpoint device to protect the endpoint device against the network attacks. For example, security module 110 may, as part of network device 202 in FIG. 2, facilitate, via wireless network 204, a security action on endpoint device 206.

The term "security action," as used herein, generally refers to any type or form of step, process, or procedure performed on an endpoint device to increase the safety and/or performance of the endpoint device. In particular, a security action may involve adjusting settings within an endpoint device that control the endpoint device's behavior when requesting and connecting to wireless networks.

The systems described herein may facilitate a security action on an endpoint device in a variety of ways. In some examples, after determination module 108 determines that an endpoint device is vulnerable to network attacks, security module 110 may alert a user of the endpoint device about the endpoint device's vulnerability and/or about potential consequences of network attacks. In addition, security module 110 may direct the user to perform one or more actions that tighten security protocols or precautions on the endpoint device to defend the endpoint device against potential network attacks.

In one example, security module 110 may direct a user to prevent an endpoint device from automatically attempting to connect to known wireless networks (especially known public and/or unsecure wireless networks). Specifically, security module 110 may prompt a user to adjust settings within an endpoint device that instruct the endpoint device to require manual direction from the user before attempting to connect to one or more known wireless networks. In another example, security module 110 may direct a user to remove a wireless network from a list of trusted or preferred wireless networks maintained by the endpoint device. This list may identify each wireless network to which the endpoint device automatically attempts to connect without user input. In some examples, due to the configuration of an endpoint device, a user may be unable to delete a wireless network from such a list while the endpoint device is not connected to the wireless network. By establishing a connection between the endpoint device and a wireless network that appears (to the endpoint device) to be the wireless network, security module 110 may enable the user to delete the wireless network from a preferred list of networks within the endpoint device, therefore preventing the endpoint device from automatically attempting to connect to the wireless network.

In some embodiments, security module 110 may direct a user to perform one or more security actions on an endpoint device via a captive portal on the endpoint device. The term "captive portal," as used herein, generally refers to any type or form of user interface or webpage displayed to a user by a network when the user attempts to access a web browser via the network. In some examples, a captive portal may require that a user complete one or more tasks before the user is allowed to access additional network resources via the network. For example, a network may require users to enter login credentials and/or provide payment (e.g., credit card information) within a captive portal before being permitted access to the network. As used herein, security module 110 may implement a captive portal that requests or requires a user to complete one or more security actions before the user's endpoint device is permitted to access a secure and/or legitimate wireless network provided by the network device hosting modules 102.

Figure 4:
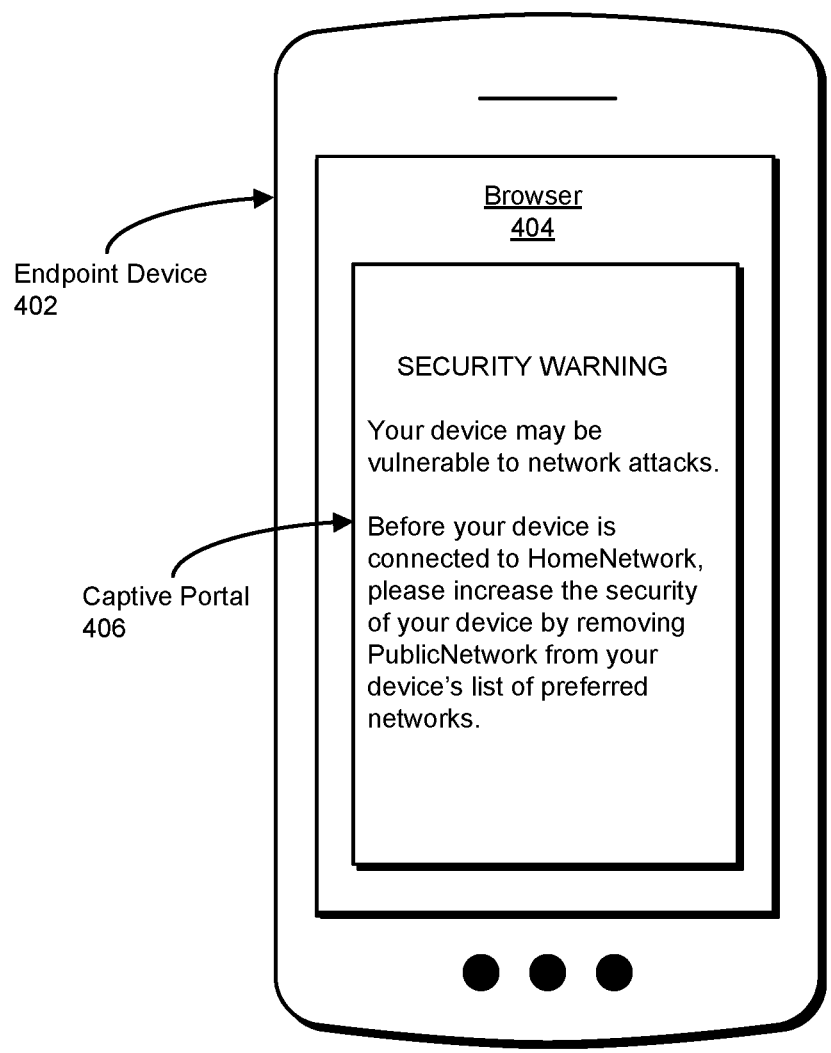
FIG. 4 is an illustration of an exemplary captive portal that directs a user of an endpoint device to increase security protocols on the endpoint device.

FIG. 4 illustrates an exemplary captive portal 406 displayed within a browser 404 running on an endpoint device 402. In this example, connection module 106 may have successfully established a connection between endpoint device 402 and a wireless network that appears to be a wireless network named "PublicNetwork." In response to establishing this connection, security module 110 may provide, via the illegitimate "PublicNetwork" connection, captive portal 406 to alert a user of endpoint device 402 that endpoint device 402 is vulnerable to network attacks. In addition, captive portal 406 may direct the user to protect endpoint device 402 by removing the "PublicNetwork" wireless network from a list of preferred networks maintained by endpoint device 402. As illustrated in FIG. 4, captive portal 406 may indicate that endpoint device 402 may be connected to a wireless network named "HomeNetwork" following completion of this action. In general, a captive portal may contain any additional information about identified security deficiencies on an endpoint device, such as further information about KARMA attacks and/or specific instructions detailing how to perform one or more security actions.

In some examples, security module 110 may determine that a security action has been completed on an endpoint device by directly monitoring or controlling the endpoint device. For example, a portion of security module 110 may be hosted on an endpoint device and may be dedicated to detecting and/or performing security actions. In other examples, the disclosed systems may determine whether a security action has been completed on an endpoint device by repeating one or more of the above-described security tests. For example, after directing a user to perform a security action on an endpoint device, the disclosed systems may provide an additional connection to an illegitimate network that appears to be a wireless network previously requested by the endpoint device. Security module 110 may then determine whether the endpoint device establishes a connection to the additional illegitimate wireless network. In the event that the endpoint device does not establish a connection to the illegitimate network, security module 110 may determine that the endpoint device has successfully implemented security protocols to protect the endpoint device against network attacks. In the event that the endpoint does establish a connection to the illegitimate network, security module 110 may determine that the endpoint device is still vulnerable to network attacks and therefore direct a user of the endpoint device to perform one or more additional security actions.

As explained above in connection with FIG. 3, a network device may receive a request from an endpoint device to connect to a wireless network. The network device may then provide a connection to an illegitimate wireless network that appears to be the requested wireless network but is not actually the requested wireless network. In the event that the endpoint device connects to the illegitimate wireless network, the network device may determine that the endpoint device is vulnerable to network attacks. As such, the network device may direct a user of the endpoint device to increase security protocols on the endpoint device, such as by instructing (via, e.g., a captive portal on the endpoint device), the user to prevent the endpoint device from automatically connecting to the wireless network.

Figure 5:
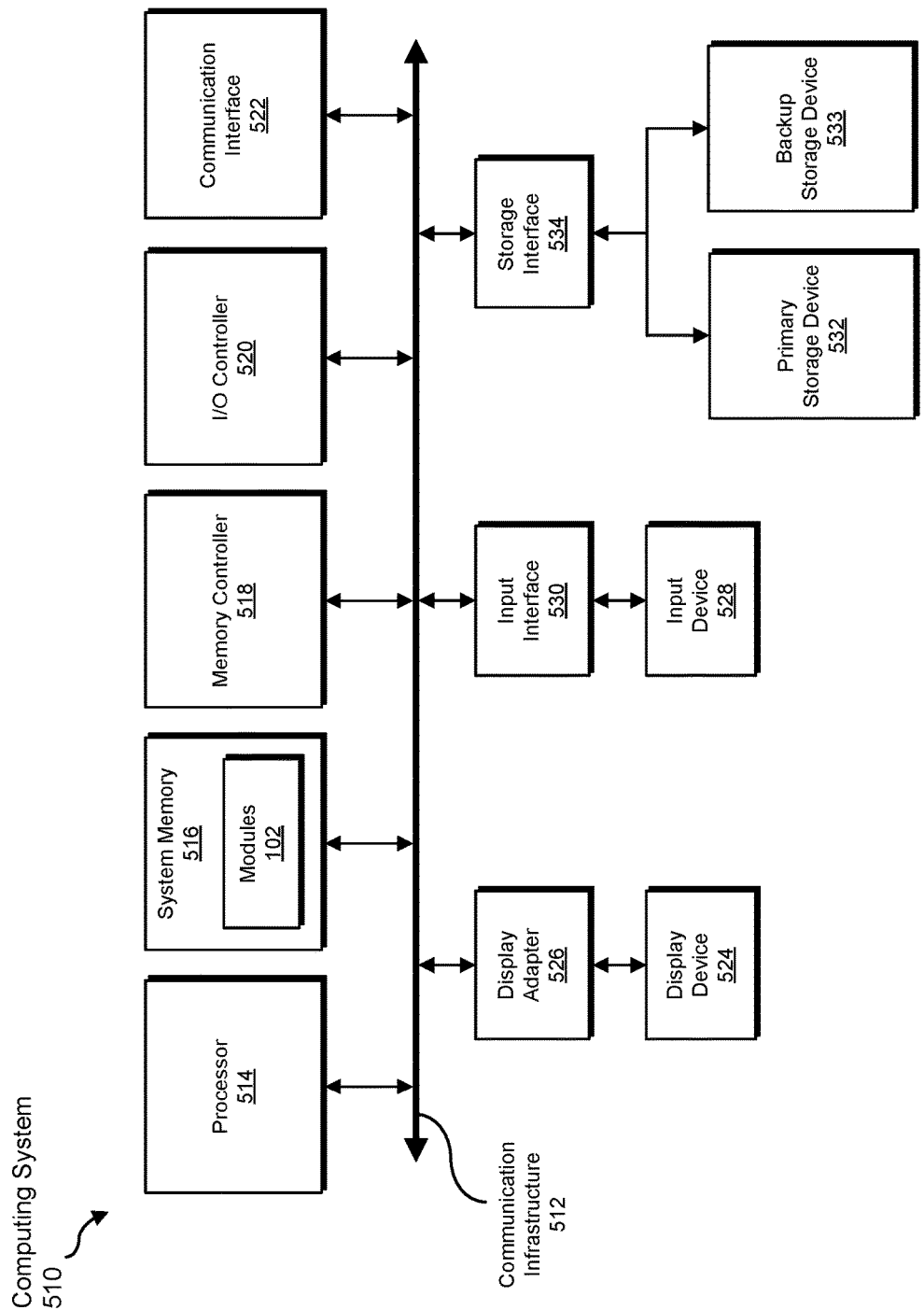
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. For example, all or a portion of computing system 510 may perform and/or be a means for performing, either alone or in combination with other elements, one or more of the steps described herein (such as one or more of the steps illustrated in FIG. 3). All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of physical processing unit (e.g., a hardware-implemented central processing unit) capable of processing data or interpreting and executing instructions. In certain embodiments, processor 514 may receive instructions from a software application or module. These instructions may cause processor 514 to perform the functions of one or more of the exemplary embodiments described and/or illustrated herein.

System memory 516 generally represents any type or form of volatile or non-volatile storage device or medium capable of storing data and/or other computer-readable instructions. Examples of system memory 516 include, without limitation, Random Access Memory (RAM), Read Only Memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an Industry Standard Architecture (ISA), Peripheral Component Interconnect (PCI), PCI Express (PCIe), or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an Application Specific Integrated Circuit (ASIC) adapted to implement one or more of the exemplary embodiments disclosed herein.

Figure 6:
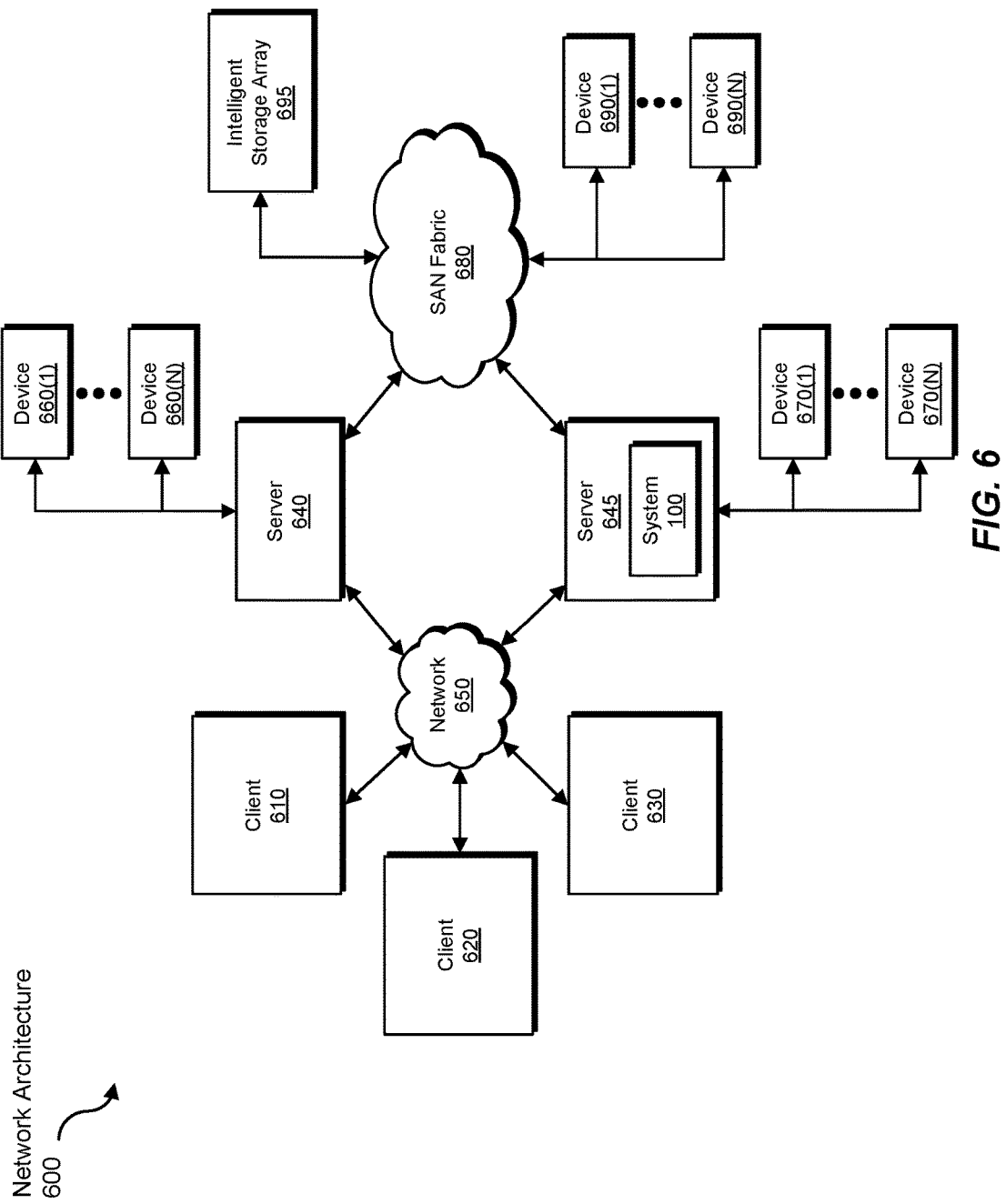
FIG. 6 is a block diagram of an exemplary computing network capable of implementing one or more of the embodiments described and/or illustrated herein.

FIG. 6 is a block diagram of an exemplary network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the steps disclosed herein (such as one or more of the steps illustrated in FIG. 3). All or a portion of network architecture 600 may also be used to perform and/or be a means for performing other steps and features set forth in the instant disclosure.

Client systems 610, 620, and 630 generally represent any type or form of computing device or system, such as exemplary computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a WAN, a LAN, a PAN, or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent Network-Attached Storage (NAS) devices configured to communicate with servers 640 and 645 using various protocols, such as Network File System (NFS), Server Message Block (SMB), or Common Internet File System (CIFS).

Servers 640 and 645 may also be connected to a Storage Area Network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an exemplary method for detecting network security deficiencies on endpoint devices.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive a request from an endpoint device to connect to a wireless network, transform the request into an indication that the endpoint device has network security deficiencies, output a result of the transformation to a user of the endpoint device, use the result of the transformation to protect the endpoint device against network attacks, and store the result of the transformation in a server or database. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for detecting network security deficiencies on endpoint devices, at least a portion of the method being performed by a network device comprising at least one processor, the method comprising:
   intercepting, at the network device, a request from an endpoint device to automatically connect to a wireless network;
   evaluating whether the endpoint device is vulnerable to network attacks involving attempts to connect the endpoint device to illegitimate networks by:
      extracting, from the request, a network identifier of the wireless network requested by the endpoint device;
      creating, by the network device, a wireless network that appears to be the wireless network requested by the endpoint device but is not actually the requested wireless network;
      indicating that the wireless network that appears to be the requested wireless network is available to the endpoint device by sending, to the endpoint device from the network device, a response that contains the network identifier of the requested wireless network;
      determining that the endpoint device establishes a network connection to the wireless network that appears to be the requested wireless network; and
      determining, based on the endpoint device establishing the network connection to the wireless network that appears to be the requested wireless network, that the endpoint device is vulnerable to the network attacks; and
   directing, via the network connection, a user of the endpoint device to increase network security protocols on the endpoint device by at least one of:
      preventing the endpoint device from automatically attempting to connect to the requested wireless network; and
      removing the requested wireless network from a list of trusted wireless networks that indicates wireless networks to which the endpoint device automatically attempts to connect.

2. The method of claim 1, further comprising determining that the endpoint device is known to the network device before evaluating whether the endpoint device is vulnerable to the network attacks.

3. The method of claim 2, wherein determining that the endpoint device is known to the network device comprises determining that the endpoint device has previously connected to a legitimate wireless network provided by the network device.

4. The method of claim 3, further comprising:
   before detecting the request from the endpoint device to automatically connect to the wireless network, detecting an additional request from the endpoint device to automatically connect to the legitimate wireless network provided by the network device; and
   facilitating the endpoint device establishing the network connection to the wireless network that appears to be the requested wireless network rather than establishing a network connection between the endpoint device and the legitimate wireless network.

5. The method of claim 4, further comprising establishing the network connection between the endpoint device and the legitimate wireless network after the user of the endpoint device has increased the network security protocols on the endpoint device.

6. The method of claim 2, further comprising managing network connections between a plurality of endpoint devices known to the network device and wireless networks that appear to be wireless networks requested by the plurality of endpoint devices based on input from an administrator of the network device.

7. The method of claim 1, wherein:
indicating that the wireless network that appears to be the requested wireless network is available further comprises indicating that the wireless network that appears to be the requested wireless network does not utilize an authentication scheme that is used by the requested wireless network; and
determining that the endpoint device is vulnerable to the network attacks comprises determining that the endpoint device connected to the wireless network that appears to be the requested wireless network despite the indication that the wireless network that appears to be the requested wireless network does not utilize the authentication scheme.

8. The method of claim 1, wherein directing the user of the endpoint device to increase the network security protocols further comprises presenting, on the endpoint device, a captive portal that prompts the user to increase the network security protocols before the endpoint device is allowed to access network resources via the network connection.

9. A system for detecting network security deficiencies on endpoint devices, the system comprising:
a detection module, stored in memory, that is configured to intercept, at a network device, a request from an endpoint device to automatically connect to a wireless network;
a connection module, stored in memory, that is configured to evaluate whether the endpoint device is vulnerable to network attacks involving attempts to connect the endpoint device to illegitimate networks by:
extracting, from the request, a network identifier of the wireless network requested by the endpoint device;
creating, by the network device, a wireless network that appears to be the wireless network requested by the endpoint device but is not actually the requested wireless network;
indicating that the wireless network that appears to be the requested wireless network is available to the endpoint device by sending, to the endpoint device from the network device, a response that contains the network identifier of the requested wireless network; and
determining that the endpoint device establishes a network connection to the wireless network that appears to be the requested wireless network;
a determination module, stored in memory, that is configured to determine, based on the endpoint device establishing the network connection to the wireless network that appears to be the requested wireless network, that the endpoint device is vulnerable to the network attacks;
a security module, stored in memory, that is configured to direct, via the network connection, a user of the endpoint device to increase network security protocols on the endpoint device by at least one of:
preventing the endpoint device from automatically attempting to connect to the requested wireless network; and
removing the requested wireless network from a list of trusted wireless networks that indicates wireless networks to which the endpoint device automatically attempts to connect; and
at least one hardware processor configured to execute the detection module, the connection module, the determination module, and the security module.

10. The system of claim 9, wherein the determination module further determines that the endpoint device is known to the network device before the connection module evaluates whether the endpoint device is vulnerable to the network attacks.

11. The system of claim 10, wherein the determination module determines that the endpoint device is known to the network device by determining that the endpoint device has previously connected to a legitimate wireless network provided by the network device.

12. The system of claim 11, wherein:
before detecting the request from the endpoint device to automatically connect to the wireless network, the detection module detects an additional request from the endpoint device to automatically connect to the legitimate wireless network provided by the network device; and
the connection module facilitates the endpoint device establishing the network connection to the wireless network that appears to be the requested wireless network rather than establishing a network connection between the endpoint device and the legitimate wireless network.

13. The system of claim 12, wherein the connection module further establishes the network connection between the endpoint device and the legitimate wireless network after the user of the endpoint device has increased the network security protocols on the endpoint device.

14. The system of claim 10, wherein the connection module further manages network connections between a plurality of endpoint devices known to the network device and wireless networks that appear to be wireless networks requested by the plurality of endpoint devices based on input from an administrator of the network device.

15. The system of claim 9, wherein:
the connection module further indicates that the wireless network that appears to be the requested wireless network is available but that the wireless network that appears to be the requested wireless network does not utilize an authentication scheme that is used by the requested wireless network; and
the determination module determines that the endpoint device is vulnerable to the network attacks by determining that the endpoint device connected to the wireless network that appears to be the requested wireless network despite the indication that the wireless network that appears to be the requested wireless network does not utilize the authentication scheme.

16. A non-transitory computer-readable medium comprising one or more computer-readable instructions that, when executed by at least one processor of a network device, cause the network device to:
intercept, at the network device, a request from an endpoint device to automatically connect to a wireless network;
evaluate whether the endpoint device is vulnerable to network attacks involving attempts to connect the endpoint device to illegitimate networks by:
extracting, from the request, a network identifier of the wireless network requested by the endpoint device;

creating, by the network device, a wireless network that appears to be the wireless network requested by the endpoint device but is not actually the requested wireless network;

indicating that the wireless network that appears to be the requested wireless network is available to the endpoint device sending, to the endpoint device from the network device, a response that contains the network identifier of the requested wireless network;

determining that the endpoint device establishes a network connection to the wireless network that appears to be the requested wireless network; and determining, based on the endpoint device establishing the network connection to the wireless network that appears to be the requested wireless network, that the endpoint device is vulnerable to the network attacks; and direct, via the network connection, a user of the endpoint device to increase network security protocols on the endpoint device by at least one of:

preventing the endpoint device from automatically attempting to connect to the requested wireless network; and removing the requested wireless network from a list of trusted wireless networks that indicates wireless networks to which the endpoint device automatically attempts to connect.

\* \* \* \* \*